(12) United States Patent
Reynolds et al.

(10) Patent No.: US 6,556,536 B1
(45) Date of Patent: Apr. 29, 2003

(54) VACUUM APPARATUS

(75) Inventors: Gerald Alfred John Reynolds, Gwent (GB); Jonathan Halliday, Gwent (GB)

(73) Assignee: Unaxis Nimbus Limited (GB)

( * ) Notice: Subject to any disclaimer, the term of this patent is extended or adjusted under 35 U.S.C. 154(b) by 0 days.

(21) Appl. No.: 09/673,835

(22) PCT Filed: Apr. 26, 1999

(86) PCT No.: PCT/GB99/01287

§ 371 (c)(1),
(2), (4) Date: Nov. 29, 2000

(87) PCT Pub. No.: WO99/56279

PCT Pub. Date: Nov. 4, 1999

(30) Foreign Application Priority Data

Apr. 24, 1998 (GB) .............................................. 9808825

(51) Int. Cl.⁷ .......................... G11B 19/20; G11B 25/04; G11B 17/34
(52) U.S. Cl. ....................................... 369/269; 369/266
(58) Field of Search ................................ 369/266, 269, 369/271, 263, 111; 360/99.09; 346/137; 250/492.3; 204/298.35

(56) References Cited

U.S. PATENT DOCUMENTS

| | | | | |
|---|---|---|---|---|
| 3,943,275 A | * | 3/1976 | Jebens et al. | 369/213 |
| 4,509,160 A | * | 4/1985 | Eggers | 369/269 |
| 5,446,722 A | * | 8/1995 | Kojima et al. | 369/266 |
| 5,798,999 A | * | 8/1998 | Labinsky et al. | 369/266 |
| 6,163,033 A | * | 12/2000 | Smick et al. | 250/441.11 |

FOREIGN PATENT DOCUMENTS

JP         08063748 A  *  3/1996  ............ G11B/7/00

* cited by examiner

*Primary Examiner*—William Klimowicz
(74) *Attorney, Agent, or Firm*—Larson & Taylor, PLC

(57) ABSTRACT

A vacuum apparatus particularly suitable for disk recording systems has a rotatable shaft mounted on a support body by an air bearing, the air bearing being provided within a vacuum chamber. A second rotatable shaft extends through the wall of the vacuum chamber in which it is mounted by a second air bearing. The second shaft has a hollow center which communicates with an output of the air bearing for removal of air exhausting from the air bearing. The air bearing may be provided within a second chamber within the vacuum chamber and may be movable relative to the axis of the second shaft. In a disk recording system, the air bearing may support a turntable.

10 Claims, 14 Drawing Sheets

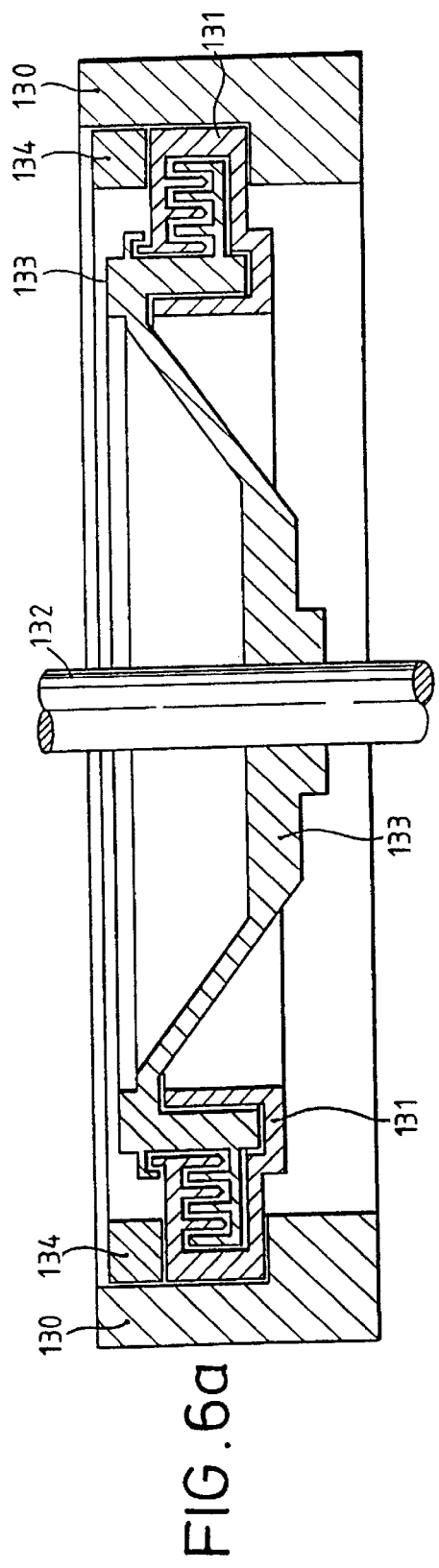
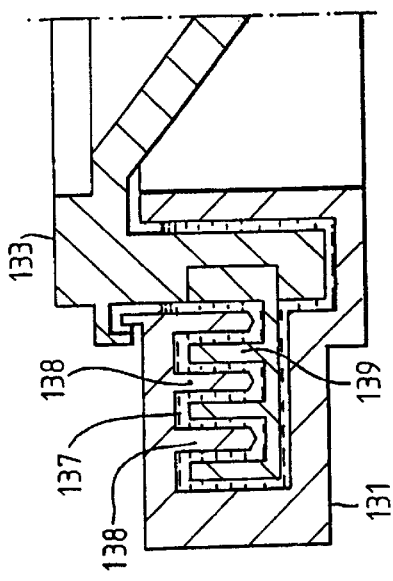
FIG.6a
FIG.6b

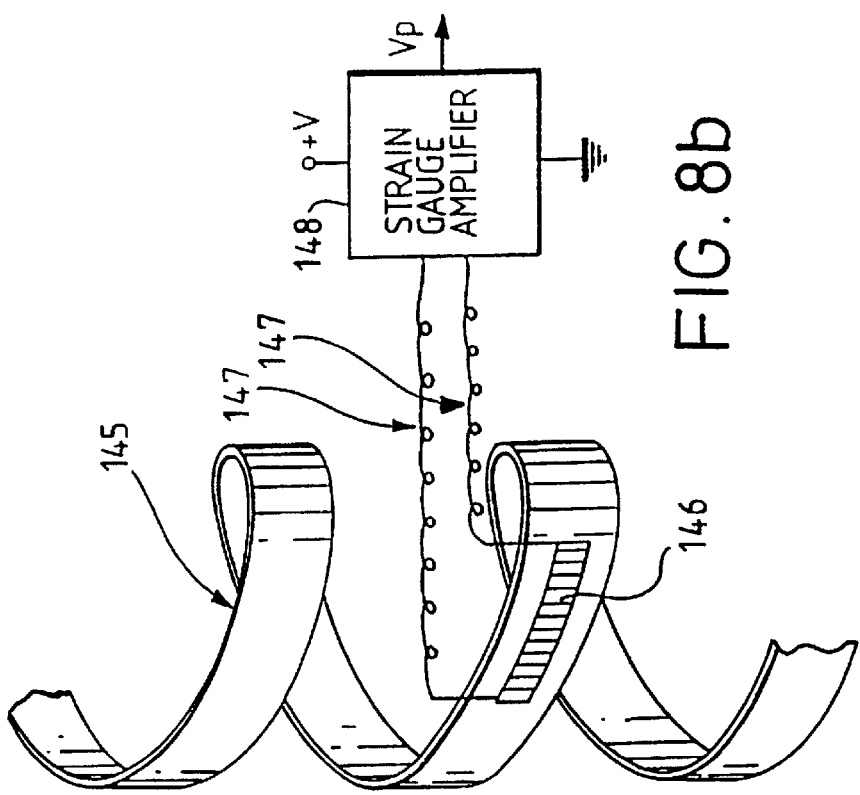
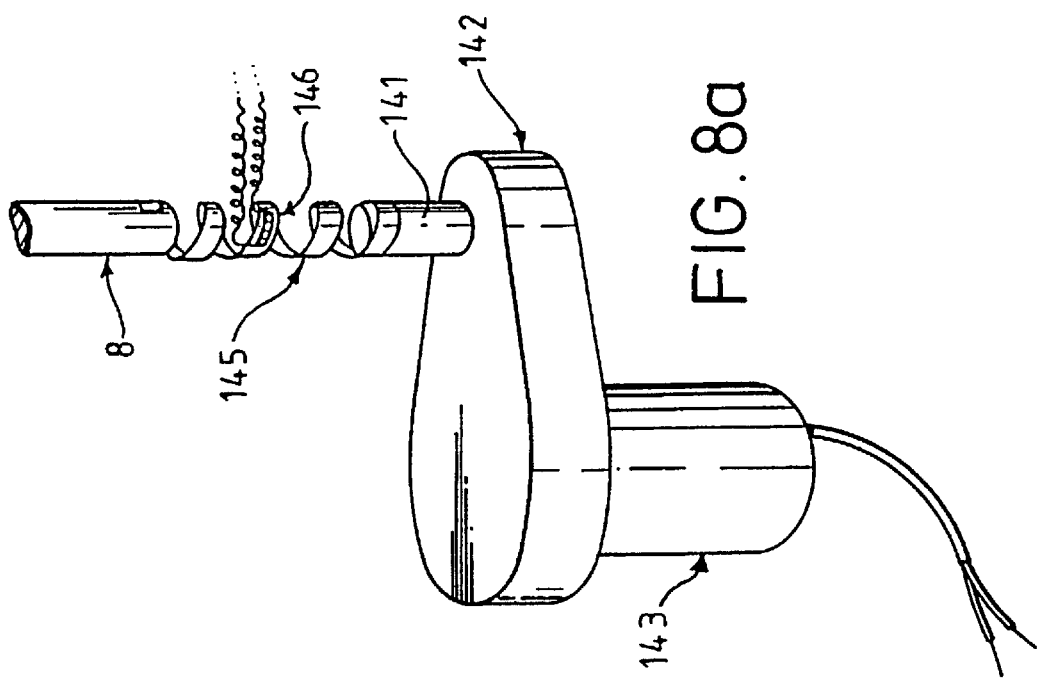

VACUUM APPARATUS

FIELD OF THE INVENTION

The present invention relates to a vacuum apparatus. In particular, the vacuum apparatus may be used in a disk recording system, for recording a disk such as a compact disk.

SUMMARY OF THE PRIOR ART

Many systems are known in which information is recorded on a disk-shaped medium and may subsequently be played back. Generally the information is arranged either in substantially circular rings or in a continuous spiral track on the disk. An example of the former arrangement is the magnetic floppy disk or hard disk, where the information is divided into sectors lying in concentric tracks. Examples of the latter arrangement include the conventional gramophone record carrying sound information in analog form in the spiral groove in its surface, the optically read videodisk carrying video information in analog form in a series of pits arranged spirally on the surface (or on an interfacial boundary) of the disk, and the compact optical disk carrying audio or other information in digital form in a series of spirally-arranged pits. The gramophone record, the videodisk and the compact disk are all examples of media available to the consumer which cannot normally be recorded on by the consumer; recording takes place on a master disk which is subsequently replicated by various processes such that the disks bought by the consumer are close copies of the geometry and the information content of the master disk.

In particular, recording onto the master disks for video disks and compact disks is conventionally performed by means of a laser beam incident on the master disk. Alternatively, an electronic beam can be used to irradiate a recording surface of a disk. In this case, a vacuum chamber must be provided in which the electron beam can operate.

The process of recording information on any of these media usually shares in common the fact that the disk or master disk is rotated at a speed typically anywhere between $16\frac{2}{3}$ r.p.m. (for some gramophone records) and 1,800 r.p.m. (or even higher for some videodisks) while the point of recording (which may be a magnetic head, a mechanical stylus, or a focussed light beam) is traversed between the inside and outer edge of the disk at a slower rate. Normally it is a requirement of the recording system that the rotational motion of the disk may vary only slowly, if at all; generally this is easily ensured by the inertia of the disk itself, together with that of the mechanism which rotates it. The radial motion of the point of recording on the disk is, however, not so easily controlled. In the case of magnetic disk recording, it is usual that the recording head must move in discrete steps between the separate concentric tracks; by contrast, in the cases of gramophone records, videodisks, or compact disks, the recording head must move continuously relative to the disk in a generally radial direction in order to lay out the information in a spiral track, and it is characteristic of these cases that the smoothness of the radial motion is more important than the absolute accuracy of radial positioning. With a gramophone record, for example, any radial motion having significant energy in the audio frequency band, even if it represents only a small fraction of the average groove spacing, will appear as a corresponding lateral movement of the pickup when the final record copy is played, and this will be audible as a noise superimposed on the recorded audio signal. With videodisks and compact disks there is not only the possibility that any sudden radial motions of the recording head will cause the player to fail to follow the track on the final disk, but also the more serious likelihood that such motions will be dangerous simply because they will result in significant changes in spacing between successive turns of the spiral track. Since this spacing is typically only 1.6–1.7 $\mu$m, in the case of Compact Discs and 0.74 $\mu$m or less in the case of higher capacity discs, and any reduction in spacing has the effect of increasing the crosstalk between tracks (resulting in interference in the picture from a videodisk, or an increased likelihood of bit errors with a compact disk) it is desirable to maintain a tolerance of at most +0.1 $\mu$m in the track spacing, and preferably a much closer tolerance than this, in the case of higher capacity discs of +0.01 $\mu$m or less.

To obtain the necessary radial tracking motion, it is usual to move the recording head along a straight line which passes through the axis of the disk, in other words radially. When recording gramophone record masters this is commonly achieved by mounting the recording head on a linear slide or rolling mount and moving it by means of a rotating leadscrew and nut. Satisfactory performance is achieved by careful engineering; the stiffness of the leadscrew drive is great enough to overcome residual friction in the mounting. In videodisk and compact disk mastering (recording) a similar technique may be used, in which the optics which produce the focussed beam are moved over the rotating master disk. To avoid the disadvantage that part of the optics are thus movable while the remainder (owing to the size of the light source, normally a laser) have to be fixed, it is alternatively possible to move the entire turntable (which carries the master disk) together with its rotary bearing along a straight line, using a leadscrew, while the recording head remains fixed.

In long-playing optical videodisks, or optical compact disks used for audio or other data in digital form, a constant linear velocity mode or recording is normally used because it allows the maximum recording time consistent with operation at the optimum linear velocity (which determines the bandwidth of the signal which can be recorded) throughout the recording.

In the system described above, either the recording head or the turntable bearing can be the moving element. However, EP-A-0619042 proposes that the turntable is arranged to rotate on a turntable bearing, and the turntable bearing itself is mounted on a support body via an air bearing so as to be moveable relative to the recording head. A fluid filled dashpot is provided for passive damping of the motion of the air bearing and thus stabilise the motion of the turntable with reference to the frame of the machine itself. Furthermore, the turntable bearing itself is a rotary air bearing.

SUMMARY OF THE INVENTION

In its most general terms, the present invention provides a rotatable shaft which passes through the wall of a vacuum chamber and provides an exhaust path for air exhausting from an air bearing within the vacuum chamber.

A first aspect of the present invention may thus provide a vacuum apparatus including a vacuum chamber, a rotatable shaft mounted on a support body via a first air bearing, the first air bearing being provided within the vacuum chamber, a second rotatable shaft extending through the wall of the casing of the vacuum chamber and mounted therein by a second air bearing, wherein the second shaft is hollow along its axis of rotation and the hollow portion is in communication with at least one air output from the first air bearing for the removal of air exhausting from the first air bearing.

The first air bearing may be enclosed in a second chamber. Using the vacuum apparatus of the invention, air required for the first air bearing can be supplied and can be removed through the second shaft.

In particular, it is envisaged that the vacuum apparatus of the invention be used in a disk recording apparatus. In such an apparatus the first air bearing may support a turntable, the turntable being located within the vacuum chamber. Since the bearing mechanism of the turntable is not exposed to that vacuum, it may comprise a bearing of a kind which cannot be used in vacuum, in particular an air bearing. Means may be provided to restrict leakage of air from the air bearing into the vacuum chamber.

A vacuum pump may be provided to evacuate the vacuum chamber to a pre-determined level. For example, in use, it is expected that the vacuum chamber will be operated at or below about $10^{-5}$ Torr.

The first air bearing may be arranged to be movable within the vacuum chamber relative to the second air bearing. In the case where the vacuum apparatus of the invention is used in a disk recording system the first air bearing may be arranged to be movable relative to the recording head and in the case in which the first air bearing is provided in a second chamber, the second chamber may be arranged to be movable relative to the recording head by mounting the second chamber on an arm rotatable about the second air bearing passing through a wall of the vacuum chamber which forms the frame of the recording system. In this case, it is particularly advantageous that the second chamber of the turntable drive mechanism communicates with an internal portion of the second shaft, so that air required for the air bearing of the turntable drive mechanism can be supplied to the second chamber, and air exhausting from the drive mechanism can be removed from the second chamber through the internal portion of the second shaft. Thus, the air bearing on which the second shaft turns may provide a very high precision frictionless mechanical connection into the vacuum chamber whilst leaving all the drive mechanism outside, and at the same time may provide a rotatable frictionless high vacuum feed through for cables and pipes to and from the first air bearing and, if present, the second chamber or other mechanism within the vacuum chamber.

For example, it is possible to provide at least one input conduit within the second shaft communicating with an input portion of a second chamber for supplying air to the first air bearing inside the second chamber, and to provide at least one output conduit within the second shaft communicating with an air output from the second chamber for removing air exhausting from the first air bearing.

The present invention may therefore provide an air bearing through a wall of a vacuum chamber to provide both a frictionless mechanical connection into the vacuum chamber and a rotatable frictionless high vacuum feed-through into the vacuum chamber.

Thus, using the apparatus of the invention, a disc can be located on a turntable and processed by an electron beam which operates in a vacuum, the turntable itself being supported by an air bearing within the vacuum chamber. The air bearing may be enclosed within a second chamber within the vacuum chamber, with the drive mechanism located outside both chambers. The electron beam can process the surface of the disc to a higher level of accuracy when using the apparatus of the invention than when using conventional systems, leading to an enhanced recording quality. Such apparatus is applicable, for example, to recordable and erasable discs, including those which carry an embossed pattern of circular or spiral tracks.

One or more vacuum sources may be provided in communication with some or all of the output portions of the first air bearing, via the output conduit(s) of the second shaft. These vacuum sources help to prevent air exhausting from the air bearing from contaminating the vacuum chamber.

For example, in the case of a recording system comprising a vacuum apparatus according to the invention, a first output from the second chamber may be the exhaust region of the first air bearing, and be placed in communication with the atmosphere surrounding the recording system, while a second ("roughing") output may be provided between the first output and the sealing means. It has been found that this measure radically reduces the pumping requirement of the pump which evacuates the vacuum chamber.

One or more vacuum sources may also be provided in communication with some or all of the output portions of the second air bearing. The vacuum source may be the same for both air bearings.

BRIEF DESCRIPTION OF THE DRAWINGS

An embodiment of the present invention will now be described in detail, by way of example only, with reference to the accompanying drawings, in which:

FIGS. 6a and 6b illustrate a second rotary dashpot which may be used in a disk recording system including the vacuum apparatus of the present invention, FIG. 6a representing a sectional view and FIG. 6b illustrating a detail of the dashpot mechanism;

FIGS. 8a and 8b illustrate another arrangement using a spring for applying a torque to the shaft of the main air bearing in the embodiment of the present invention, together with a means for monitoring the strain on the spring, FIG. 8a being a perspective view of the arrangement and FIG. 8b being a detailed view of part of the arrangement of FIG. 8a;

FIG. 10a being a sectional view and FIG. 10b being an exploded view of the disks of FIG. 10a;

DETAILED DESCRIPTION

Figure 1:
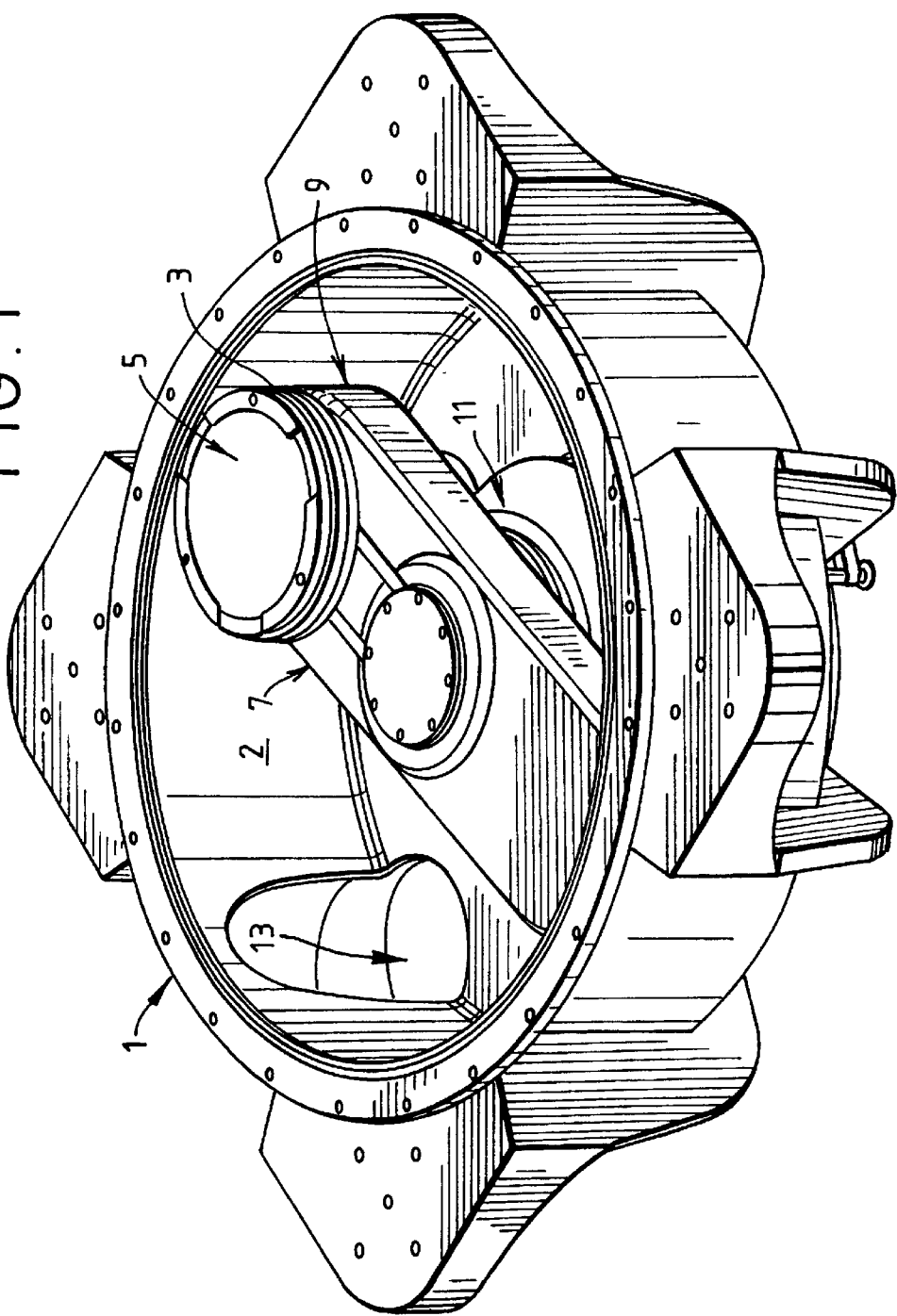
FIG. 1 is a perspective view of a disk recording system including the vacuum apparatus according to the invention with a roof portion of the vacuum chamber removed.

As shown in FIG. 1, a disk recording system including a vacuum apparatus according to the invention includes a partition 1 defining a vacuum chamber 2(a lid element, cooperating with the partition 1 and defining a roof portion of the wall of the vacuum chamber, is not shown). Within the vacuum chamber 2, a turntable 3 has an upper surface S for supporting a glass master disk. The turntable 3 is located at one end of an arm 7, and arranged to be turned about an axis perpendicular to the surface of the turntable by a drive unit located within a second chamber 9 mounted on the end of the arm 7. The arm 7 is arranged to rotate about a central radial pivot bearing 11. A turbo pump 13 is provided to evacuate the vacuum chamber 2.

Figure 2:
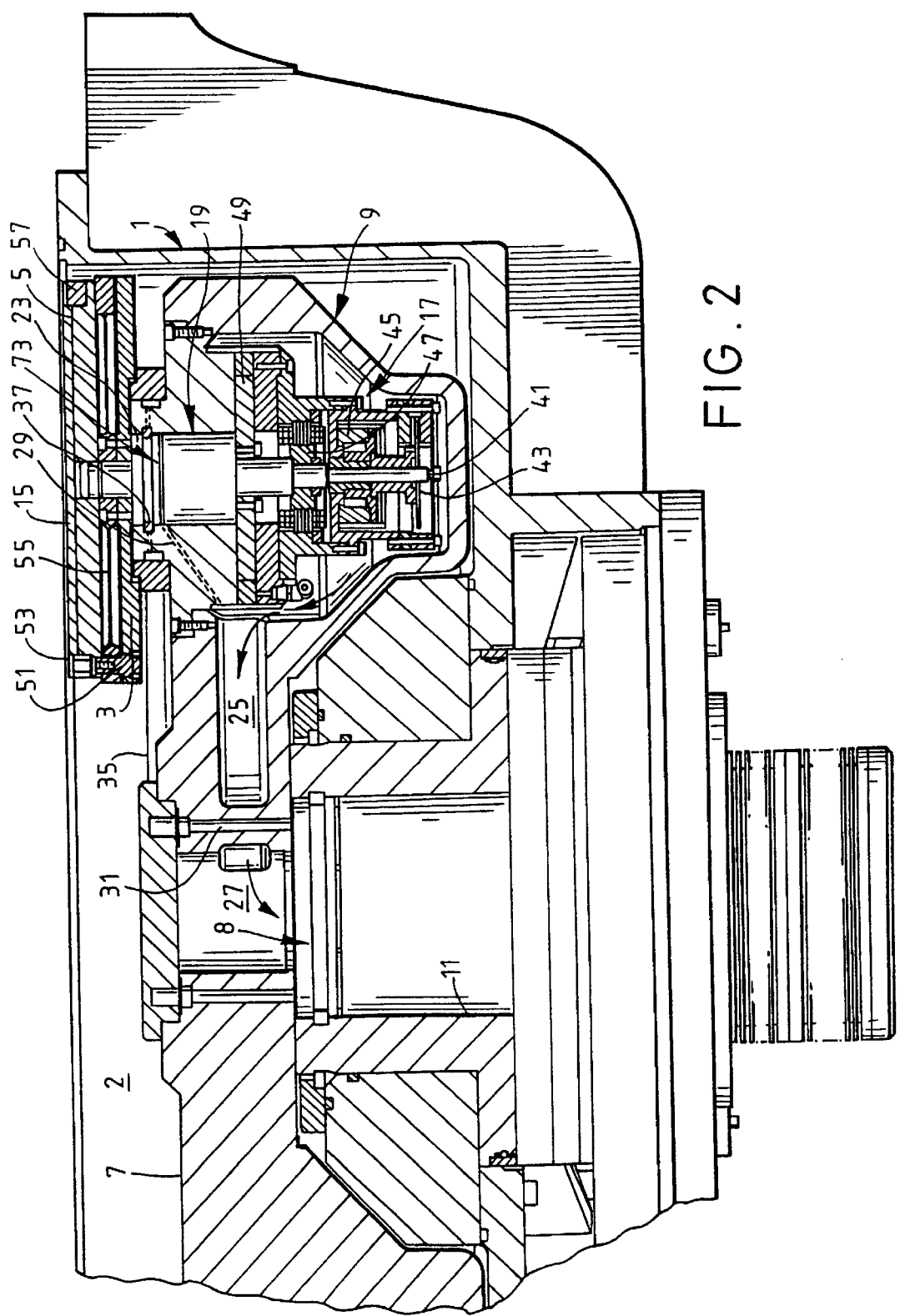
FIG. 2 is a cross-sectional view of the system of FIG. 1.

FIG. 2 is a cross-sectional view of this disk recording system in a plane including the axis of the bearing 11 and the central axis of the second chamber 9. As shown, the turntable 3 includes a body defining an upper surface 5 upon which a glass master 15 can be positioned. The turntable 3 is mounted on a shaft 73 which can be rotated by a drive mechanism 17 via a journal air bearing 19.

The second chamber 9 is mounted at one end of the arm 7, which is itself mounted on the upper end of a shaft 8 extending downwardly. The shaft rotates within an air bearing 11 mounted on the frame of the recording device.

The inside of the second chamber 9 is sealed from the vacuum chamber 2 by a seal 23 located at the upper end of the air journal 19 (as shown in FIG. 2). Air is supplied to the air journal bearing 19 (through an input conduit which is not shown) and exits from the air journal bearing 19 at both ends. Air exhausts from the lower end of the bearing 19 into the lower portion of the chamber 9 and channels are provided to conduct air into a cavity 25 in the arm 7 which communicates with an output conduit 27 located within the shaft 8. A second output portion of the chamber 9 is the upper end of the bearing, which is in communication with the cavity 25 via a channel 29. The conduit 27 is vented to the atmosphere, so that air exhausting from the air bearing can pass into the chamber 25, and via the conduit 27 to the atmosphere. This provides a passive exhaust of the gas from the bearing.

Additionally, a second series of output conduits 31 in the shaft 8 leads to a vacuum pump, and is in communication with a tube 35 which communicates with an output portion 37 of the second chamber 9. The output channel 37 is between sealing means 23 and the input end of the exhaust channel 29. The vacuum pump thus provides a roughing effect to remove gas exhausting from the air pump before it leaks through the sealing means 23 and into the vacuum chamber 21.

The drive mechanism 17 may be as disclosed in EP-A-0619042.

The drive mechanism 17 of the device includes an earthing contact 41, a polarising disk 43 for electronic commutation of the motor, an optical encoder 45, and a brushless motor 47. A thrust bearing 49 supports the turntable 3.

The turntable itself includes a number of differential thread levelling screws 51, a clamping ring 53, which provides location and electrical contact to the top face of the glass master disc, a levelling diaphragm 55, and a glass carrier 57.

Figure 3:
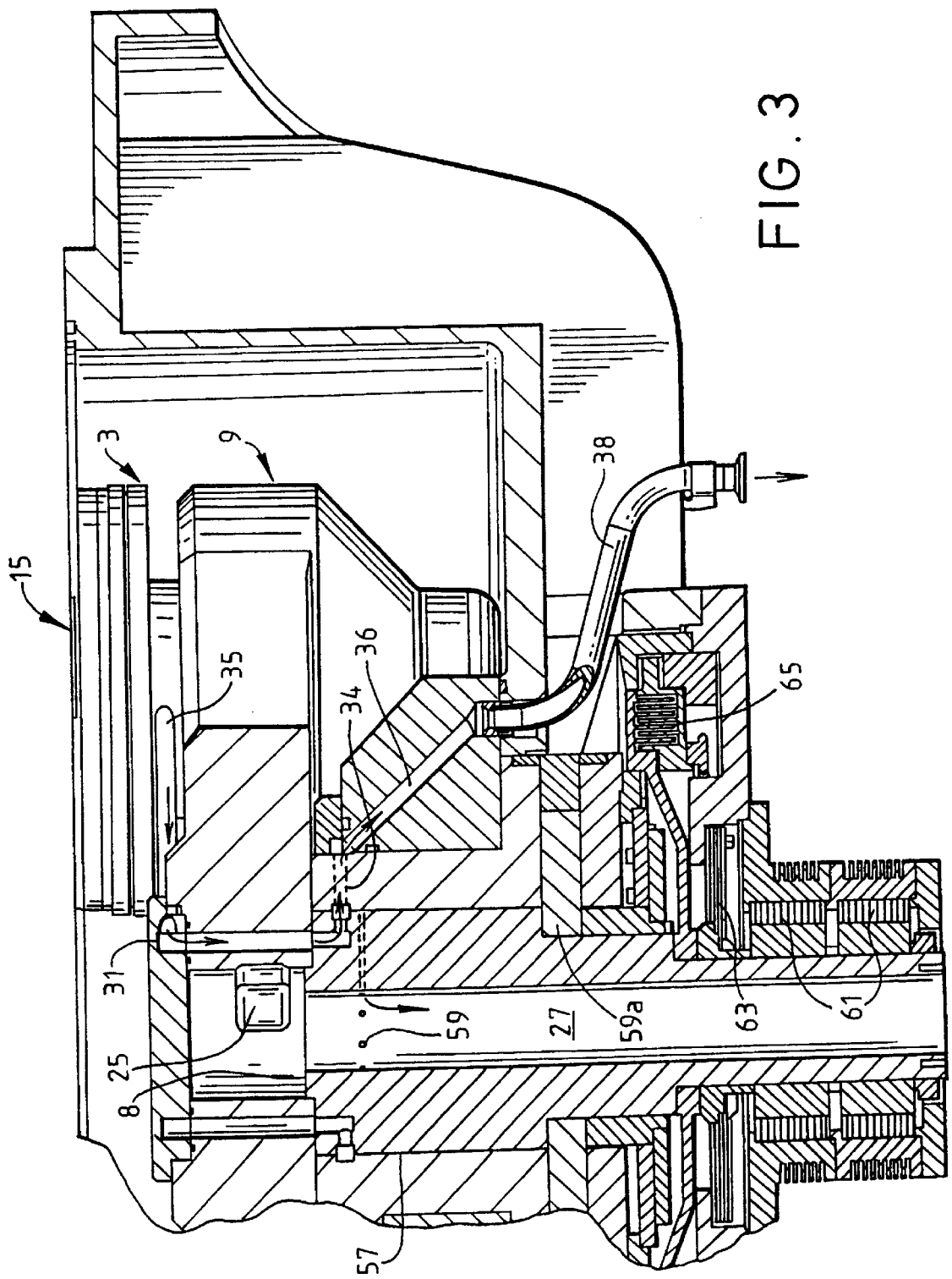
FIG. 3 is a second cross-sectional view of the system of FIG. 1.

FIG. 3 is a cross-section of the same disk recording system in a second vertical plane including the axis of the bearing 11 but not, in this case, including the axis of the second chamber 9.

FIG. 3 illustrates how the cavity 25 in the arm 7 communicates with the output conduit 27 in the shaft 8. Similarly, the channel 35 in the arm 7 communicates via output conduit 31 in the shaft 8 and further channels 34, 36, 38 formed in the non-rotating portion of the system with a roughing pump. Passive vents 59 also communicate with the output conduit 27 in an intermediate portion of the shaft 8 for passive exhaustion of air from the radial journal bearing 57 formed on the outer surface of the shaft 8. Air exhausting from the journal bearing 57 may therefore be removed via vents 59 passively and via channels 34, 36 and 38 which may be connected to a vacuum pump. The cavity 27 in the shaft 8 accommodates cables, pipes, etc. for transmission of air or electric signals to the inner portion of the second chamber 9 and such other devices as are attached to arm 7 within the vacuum chamber.

The mechanism of the bearing 57 and the drive mechanism for the shaft may be as disclosed in EP-A-0619042. A thrust bearing 59a supports the shaft 8. Torque motors 61 rotate the shaft 8, while a rotation sensor 63 measures rotation of the shaft 8. A damper 65 provides frictionless viscous damping of the rotation of the shaft 8.

Figure 4:
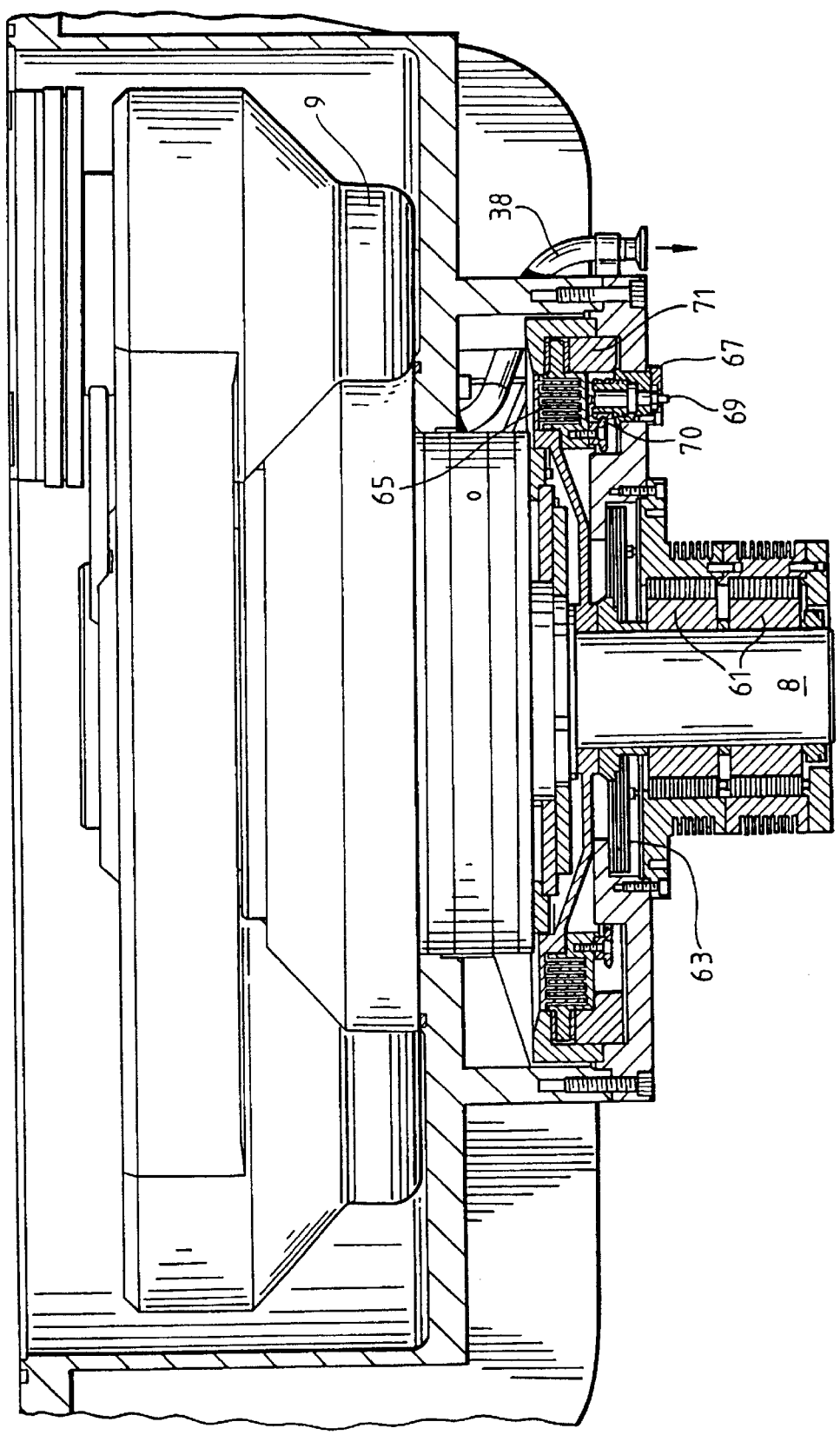
FIG. 4 is another cross-sectional view of the system of FIG. 1.

FIG. 4 is another cross-sectional view of the system through a plane including the centre of the shaft 8, but again not including the centre of the second chamber 9. It shows in more detail the working of the drive mechanism which rotates the shaft 8.

The drive mechanism includes torque motors 61, and a rotary viscous damper 65. A slewing-ring 70 is provided to rapidly rotate the damper 65 and the shaft 8 and thence the arm 7. The clamping ring 71 can clamp or release the outer part of damper 65.

Figure 5A:
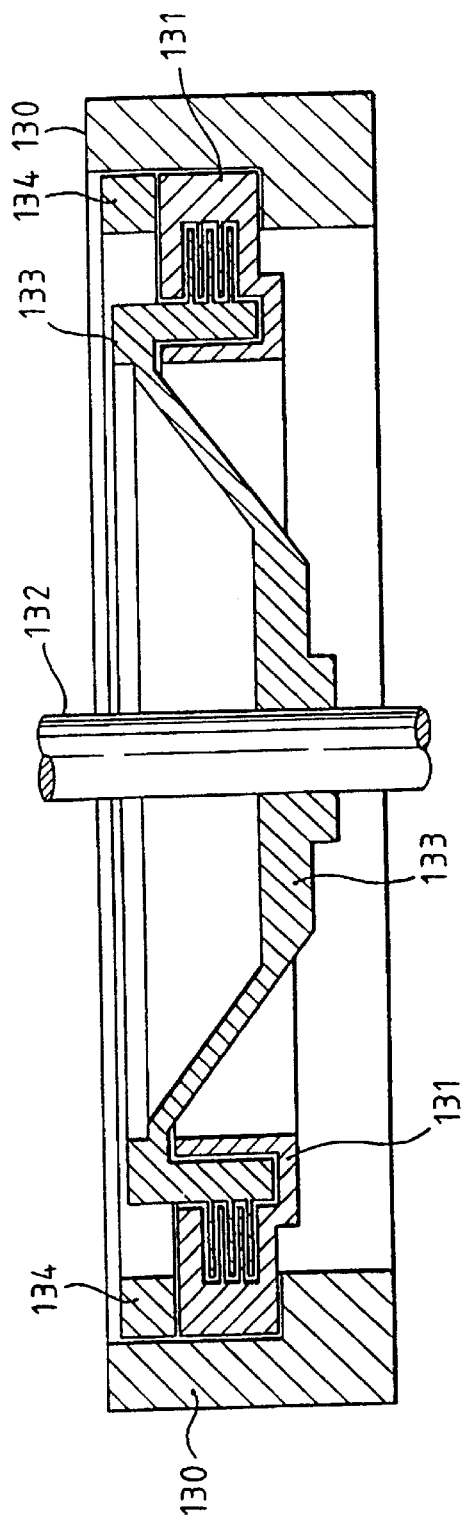
FIGS. 5a and 5b illustrate a first rotary dashpot which may be used in a disk recording system including the vacuum apparatus of the present invention, FIG. 5a being a sectional view and FIG. 5b being a detail of the dashpot mechanism.

FIG. 5a shows the construction of a dashpot which can be used as the damper 65 in this embodiment. It consists of interleaved thin annulae.

In FIG. 5a, an annular mounting 130 supports a fixed damping element 131. The fixed damping element 131 surrounds a shaft 132 (which may e.g. correspond to shaft 8 in FIG. 2 so that the dashpot corresponds to the damper unit 65 of FIG. 4) and a moving damping element 133 is fixed to that shaft. The fixed damping element 131 is secured to the mounting 130 by a clamping member 134, which is pressed down by springs (not shown).

Figure 5B:
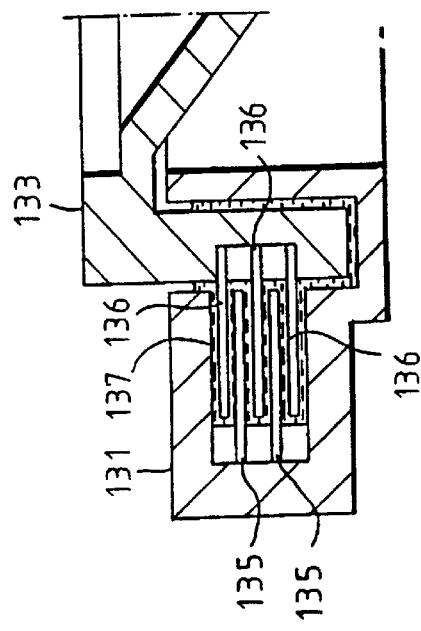

As shown in more detail in FIG. 5b static vanes 135 are provided in the fixed damping element 131, which are interleaved with moving vanes 136 secured to the moving damping element 133. A viscous fluid 137 fills the resulting dashpot.

FIGS. 6a and 6b illustrate an alternative dashpot arrangement, having interleaved concentric cylindrical sections. Components of FIGS. 6a and 6b corresponding to those of FIGS. 5a and 5b are indicated by the same reference numerals. As can be seen from FIG. 6b, however, the static cylindrical sections 138 are vertical, as are the moving vanes 139. Again, if this dashpot is used in the embodiment of FIG. 1, the shaft 132 may correspond to the shaft 8 so that the dashpot forms the damper unit 65.

The cylindrical geometry of FIGS. 6a and 6b is preferred because is allows freedom of adjustment of the movable elements in a vertical direction and because it is easier to fill the structure with fluid without causing bubbles. Radial gaps may be left at intervals in one set of cylindrical sections, in order to allow the fluid to distribute itself evenly. A very high viscosity is required to control the very slow speeds of motion required for example in compact disk recording, but suitable fluids are readily obtainable, for example the fluids sold under the brand name "Hyvis" by British Petroleum Ltd. and available in a range of viscosities. In order to fill the structure with fluid, the viscosity of the fluid may be reduced by heating it. A further feature of the use of a rotary bearing in conjunction with a rotary dashpot according to this embodiment of the present invention is that rapid changes to the position of the movable elements may be effected by raising the clamp 134 to free the entire dashpot assembly so that the outer dashpot element 131 rotates within its mountings 130.

The driving force to produce the relative motion of moving and fixed parts may, as stated above, be generated by a direct-drive electric motor using the moving-coil, moving-magnet, induction or hysteresis principles. In accordance with the principles expressed above the motor must not contribute any friction to the relative motion; this is readily achieved if the moving part of the motor has no bearings of its own but is mounted directly on the shaft 8 of the rotary air bearing. If commutation of the drive current is required (as in conventional moving-coil d.c. motors) then it should be generated electronically by any of a variety of known means, rather than by mechanical switching.

Alternatively, it has been found possible to exert the necessary torque on the moving system by means of a spring, for example a coil spring whose further end is secured, for example, to the output shaft of a reduction gearbox, the input shaft of which is driven by a conventional d.c motor. It is apparent that even if the said output shaft is held in a fixed position, the spring will exert a torque which changes only slowly as the moving parts of the air bearing and damper assembly rotate; thus it is in the nature of this arrangement to produce a substantially constant relative motion by purely passive means, and any adjustments to the speed of relative motion can be performed by driving the gearbox in a relatively crude manner.

Figure 7:
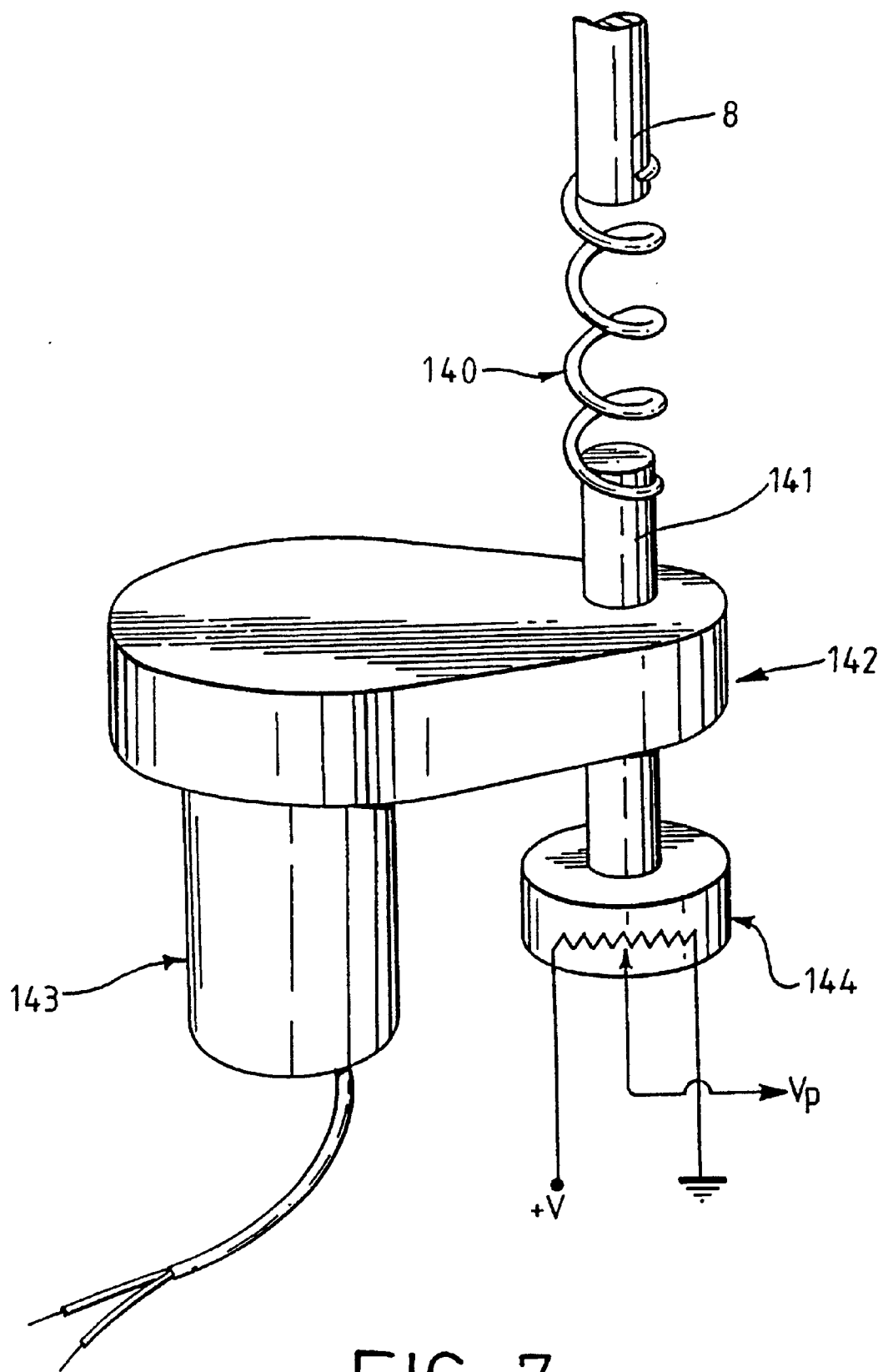
FIG. 7 illustrates an arrangement using a spring for applying the torque to the shaft of the main air bearing in an embodiment of the present invention, together with a means for monitoring the rotation of the end of the spring remote from the shaft.

Thus, FIG. 7 shows that the shaft 8 is connected to a spring 140, which in turn is connected to the output shaft 141 of a gearbox 142, which gearbox 142 connects the shaft 141 to a motor 143. It is found advantageous to place the motor/gearbox assembly in an inner servo loop having a relatively short response time. In order to make this possible, the shaft 141 also extends to a rotary potentiometer 144. Thus, the output signal $V_p$ of the potentiometer 44 corresponds to the position of the shaft 141.

FIGS. 8a and 8b illustrate an alternative arrangement, in which the strain in the spring itself is sensed in order to drive the inner servo loop. Components which correspond to those of FIG. 7 are indicated by the same reference numerals. In FIG. 8a, the spring 145 has a flat section, and a strain gauge 146 is mounted thereon. As is shown in more detail in FIG. 8b, the strain gauge is connected via flexible connections 147 to an output amplifier 148, which generates an output signal $V_p$.

Figure 9:
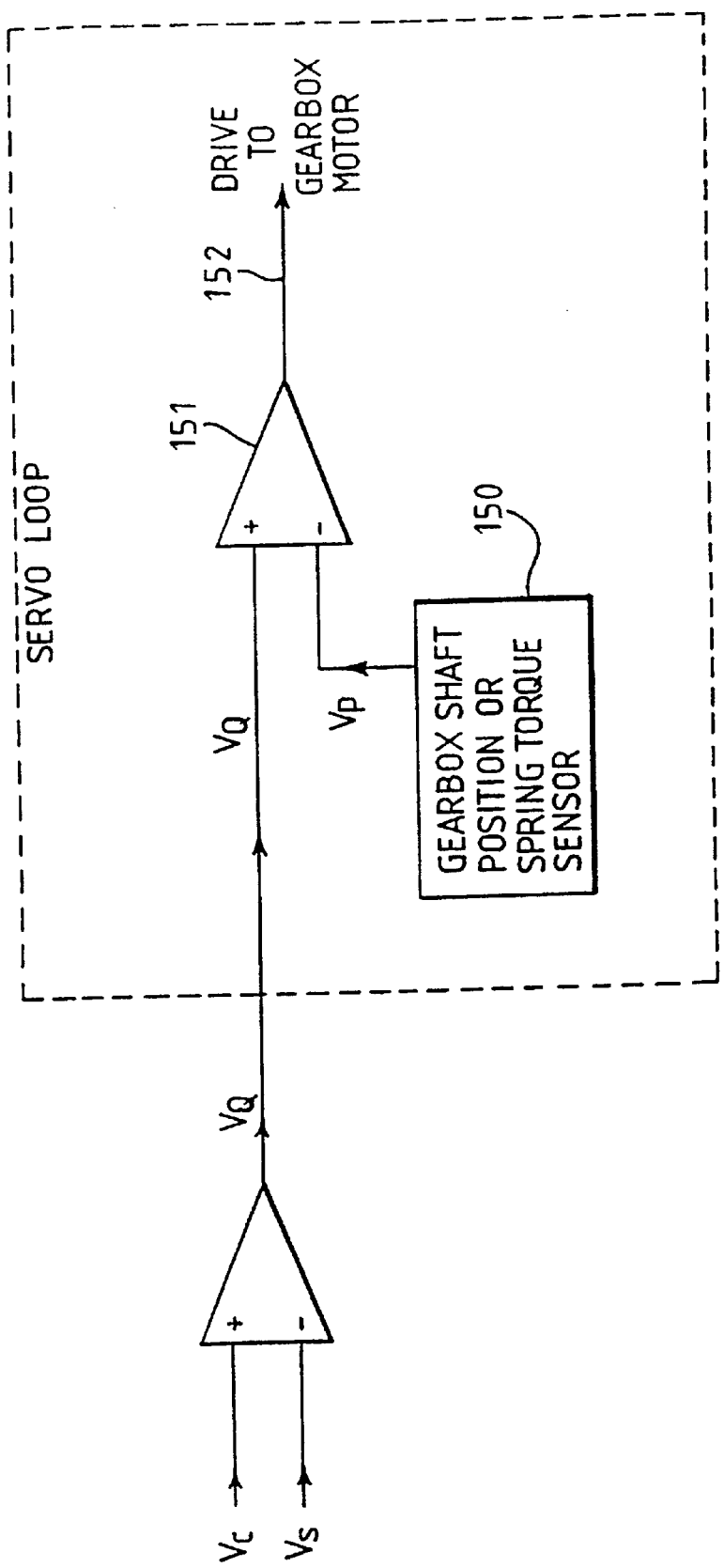
FIG. 9 shows a local servo loop for controlling the motor arrangement of FIG. 7 or FIGS. 8a/8b of the first embodiment of the present invention.

FIG. 9 shows the inner servo loop referred to above. In FIG. 9, the gearbox shaft position sensor (from FIG. 7) or the spring torque sensor (from FIGS. 8a and 8b) is shown at 150. The output signal $V_p$ from this sensor is fed to a differential amplifier 151. That differential amplifier 151 also receives a control voltage $V_Q$ and generates an output 152 which drives the gearbox motor 143. Thus this inner servo loop causes the sensor output $V_p$ to follow the control voltage $V_Q$.

The signal $V_Q$ is generated by a further servo loop (which will be discussed in more detail later) which has a slow response, so that the position of the gearbox output shaft, and hence the torsion in the spring and hence the speed of motion of the movable elements (namely the main air bearing rotor, the movable part of the dashpot and the complete turntable bearing assembly), is controlled by comparing an external control voltage $V_c$ with a voltage $V_s$ representative of the speed of motion and obtained from position sensing means for example as described below.

Figure 10A:
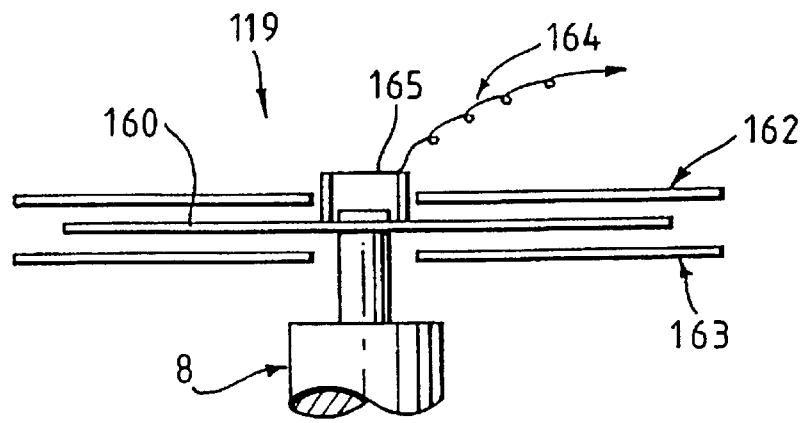
Figure 10B:
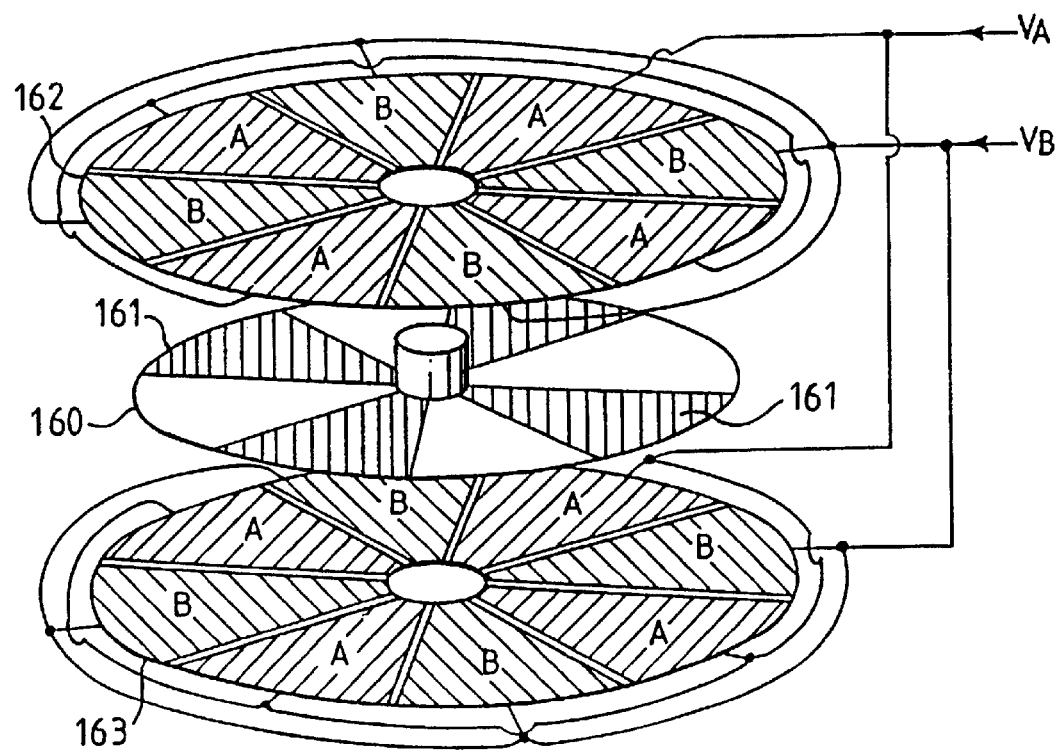

Turning now to the means of sensing the position of the movable parts, which may form the sensor unit 63 in FIG. 4, it is proposed that a capacitive electrical sensing device is provided as in FIGS. 10a and 10b. In the arrangement illustrated, the shaft 8 carries an insulating disk-shaped rotor 160. This rotor carries on both its surfaces conducting sectors 161 occupying part of each surface. This rotor is mounted between insulating plates 162, 163 attached to the fixed framework, each of which carries on its inward-facing surface conducting sectors (A,B) separated by narrow gaps. The number of such sectors depends on the angular range of rotation which it is desired to sense, but in the arrangement illustrated there are eight sectors allowing a maximum movement of 45°. The rotor 160 carries on each face four sectors 161, each subtending 45° at the centre and equally spaced apart so that the spaces between them also subtend 45°. The conducting sectors 161 on the two faces of the rotor 160 are aligned together and are all electrically connected to a conducting cylinder 165 and a flexible lead 164. The conducting sectors on the two fixed plates 162, 163 are aligned in opposite-facing pairs which are electrically connected, and in addition alternate sectors on each plate are electrically connected, so that there are in all two sets of alternate sectors (A and B) each sharing a common electrical connection on the two fixed plates 162, 163.

Alternative, but functionally equivalent methods of construction will of course be apparent to those skilled in the art, for example to form either the fixed conducting sectors, or the moving ones, or both, from metallic material in ways other than by forming them on the surface of an insulating material, and in particular for all the moving sectors to form one self-supporting piece of metal.

Figure 11:
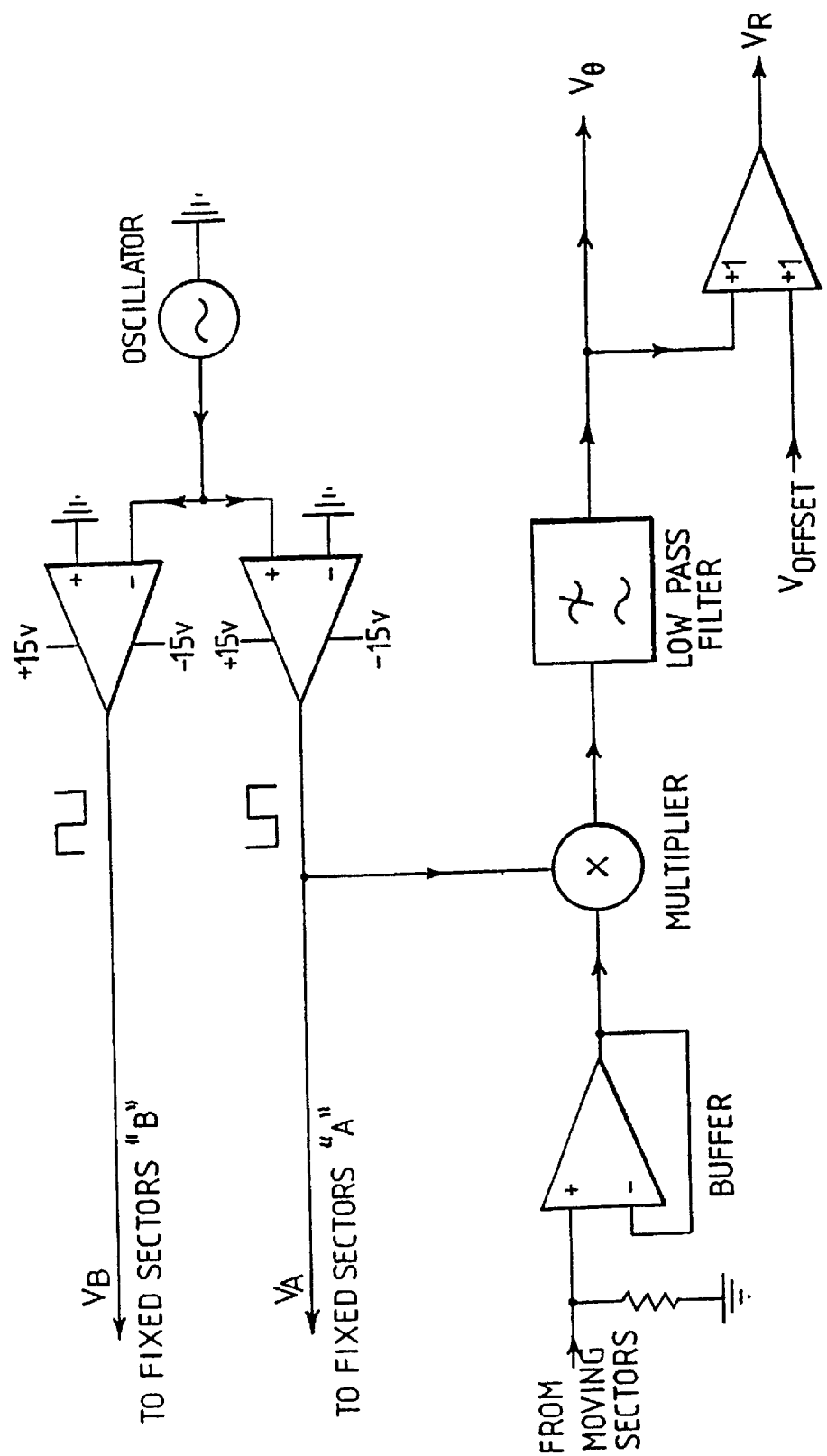
FIG. 11 is a block diagram of an electrical circuit for processing the output of the sensing device of FIGS. 10a and 10b.

Then equal and opposite alternating electrical voltages ($V_A$ and $V_B$) are applied to the two sets of fixed sectors. Preferably, these voltages are square waves of amplitude for example 30 volts peak-to-peak. As a result of capacitance between the conducting sectors on the rotating disk 160 and the sectors on the fixed plates 162, 163, an alternating voltage appears on the conducting sectors on the disk 160, of waveform similar to that of the voltages applied to the sectors of the fixed plates 162, 163 and of magnitude and phase depending on the azimuthal position of the said conducting sectors on the rotating disk 160 in relation to the sectors on the fixed plates 162, 163. This voltage may be buffered (and optionally amplified) by, for example, an operational amplifier of low gain and high input impedance, connected by the flexible lead 64, and forms the input to a phase-sensitive detector (essentially a multiplier followed by a low-pass filter) whose reference input is the waveform applied to one set of the fixed sectors as shown in FIG. 11. From this phase-sensitive detector a d.c. output $V_\theta$, is obtained, which is representative of the orientation (θ) of the moving sectors relative to the fixed sectors.

It may readily be shown that the d.c. voltage $V_\theta$ is substantially proportional to $$\frac{C_A - C_B}{C_A + C_B},$$

where $C_A$ and $C_B$ are the capacitances between the movable sectors and one or other set of fixed sectors respectively. If the disk and the fixed plates are flat and parallel at all times then these capacitances are in turn proportional to the areas of overlap between the movable sectors and the respective fixed sectors. If the sectors have circular inner and outer edges, then these areas are linear functions of the azimuthal angle θ, and $C_A+C_B$ is a constant. It can then be seen that the d.c. voltage $V_\theta$ is a substantially linear function of θ, except near the points ($\theta_A$ and $\theta_B$) at which the rotating sectors are aligned with one or other set of fixed sectors. FIG. 10 shows the dependence of $V_\theta$ on θ for the case where the sectors subtend 45° at the centre. Owing to its symmetrical construction, the sensing device of FIGS. 10a and 10b is tolerant of situations where the rotor 160 is not exactly equidistant from, or parallel to, the fixed plates 162, 163.

Clearly this rotation sensing device may be modified in a number of ways obvious to those skilled in the art. For example, the number of sectors may be increased so as to subtend less than 45°; the sensitivity, i.e. the rate of change of $V_\theta$ with θ, is then increased but the linear working range ($\theta_B-\theta_A$) becomes less.

When this rotation sensing means is applied to the embodiment of the invention shown in FIG. 1 so as to measure the azimuthal position of the swinging turntable bearing assembly in its arclike motion, it may be objected that, although the voltage $V_\theta$ is a substantially linear function of θ, it is not thereby a linear function of the distance of the recording head from the centre of the master disk. The latter distance may be expressed as $2R_c$ sin $$\left(\frac{\theta - \theta_0}{2}\right),$$

where $R_c$ is the radius of the motion of the turntable bearing assembly on its swinging arm and $\theta_o$ is the value of θ when the recording head lies over the centre of the master disk (assuming that the system is aligned so that there is such a position), and sin $$\left(\frac{\theta - \theta_0}{2}\right)$$

is not a linear function of θ. However, a geometry may be chosen for which the linearity is adequately good for the present purpose. For example, if $R_c$=200 mm and it is desired to record compact disks with a radius of 60 mm, then $(\theta-\theta_o)$=17° maximum, and at this maximum excursion the voltage $V_\theta$ differs by only 0.4% from the value linearly extrapolated from small values of $(\theta-\theta_o)$ A correction for this error may be made electronically if necessary.

In general it will be found desirable to position the rotation sensing means such that a zero value of $V_\theta$ does not correspond to zero recorded radius (i.e. the position where the recording head lies directly over the axis of the turntable). A voltage $V_R$ which does so correspond may be obtained by adding a suitably chosen fixed reference voltage ($V_{OFFSET}$) as shown in FIG. 11.

Figure 12:
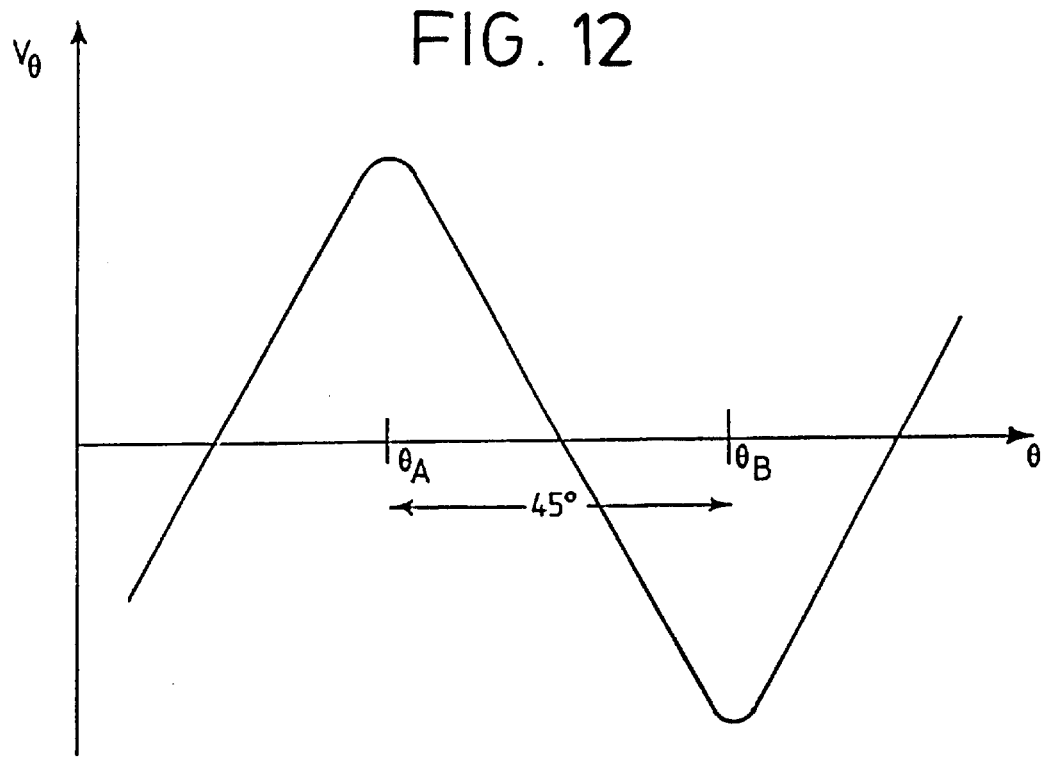
FIG. 12 shows the variation of the output $V_\theta$ from the circuit of FIG. 11.
Figure 13:
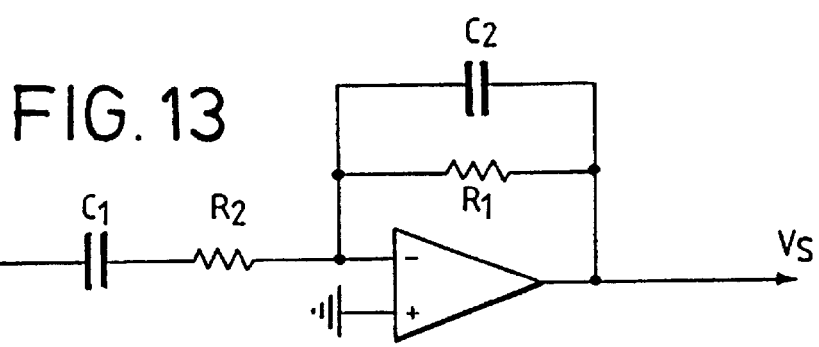
FIG. 13 shows a differentiating circuit for generating a further output voltage from the output circuit of FIG. 11.

It is found experimentally that a very good signal-to-noise ratio may be obtained with this arrangement, and in particular that it is possible to obtain electronically a second output voltage $V_s$ which is adequately representative of the rate of change of $V_\theta$ (in other words, representative of the speed of radial motion, $$\frac{dR}{dt}$$

of the recording head relative to the master disk) to be used in a servo loop to control the radial motion. The second output voltage $V_S$ may be obtained by a differentiating circuit as shown in FIG. 12. As discussed above in connection with $V_\theta$, there is a small radius-dependent error in $V_s$ (owing to the geometry of the swinging arm in the embodiment of FIG. 1), which may be corrected electronically if necessary.

The differentiating behaviour of this circuit is primarily determined by $C_1$ and $R_1$. The optional components $R_2$ and $C_2$ each serve to limit the high-frequency response of the circuit by introducing first-order low-pass responses with time constants $R_2C_1$ and $R_1C_2$, thus reducing the high frequency noise which appears in the output. It has been found possible to control the said speed of radial motion in a system for recording compact disks in the manner herein described, notwithstanding that the said speed is only of the order of a few microns per second.

Figure 14:
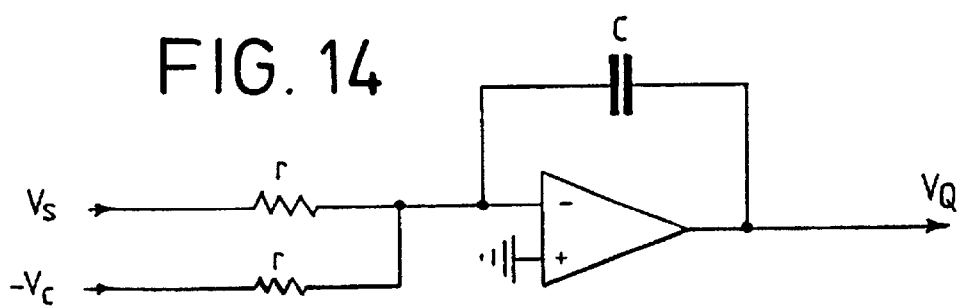
FIG. 14 shows a servo amplifier for use in the present invention.

FIG. 14 shows the structure of a suitable servo amplifier for controlling the speed of the radial motion. The voltage $V_S$ representative of the speed of radial motion is compared with a control voltage $V_C$ representative of the desired speed, and the difference ($V_S-V_C$) forms the input to an amplifier. The output $V_Q$ of this amplifier controls the speed of radial motion, for example by controlling the torque applied to a rotary bearing system damped by a dashpot, for example by a direct-drive electric motor or alternatively by rotating the one end of a coil spring whose other end is attached to the movable element. The action of the servo system is such as to tend to maintain $V_s$ equal to $V_c$. The servo amplifier shown in FIG. 14 has an integrating response, and by adjusting the values of the resistors r and the capacitor C the overall response time of the servo system may be set to a suitable value, for example 5 to 10 seconds, such a value being found to be a good compromise between a long response time causing the system to be too slow in settling down and a short response time allowing too much noise from the rotation sensor to be impressed onto the radial motion.

Figure 15:
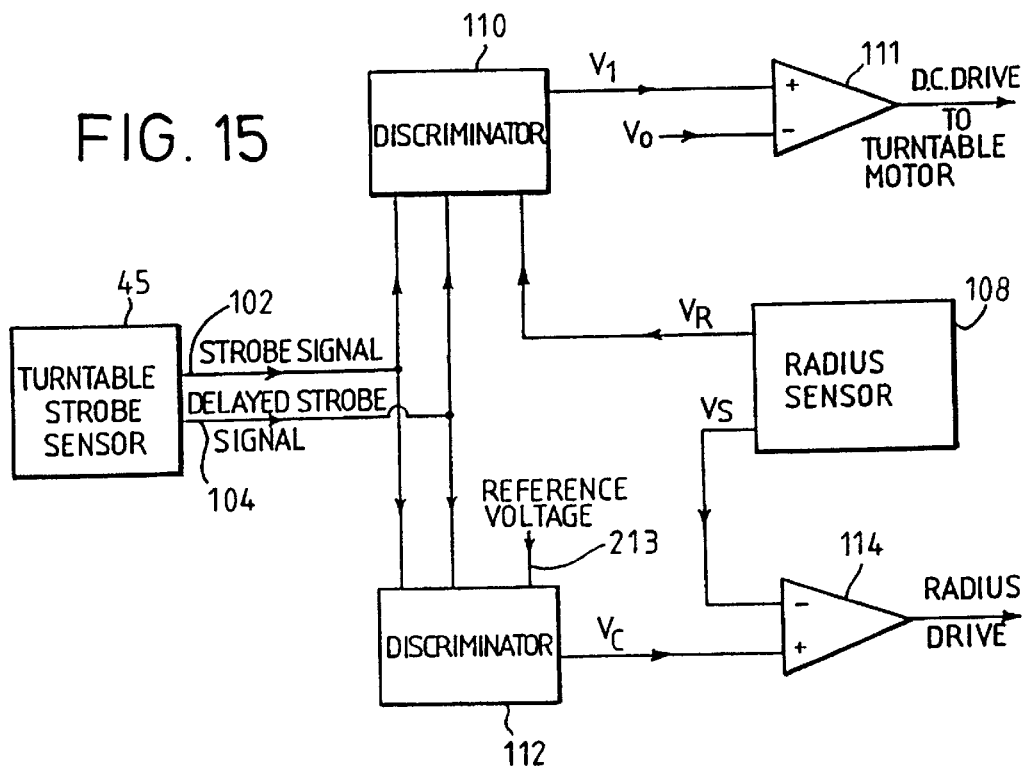
FIG. 15 shows the servo system for the disk recording system of FIG. 1.

FIG. 15 shows a servo system for controlling the disk recording system of FIG. 1. In FIG. 15, a radius sensor 108 generates both a radius voltage $V_R$ and a radial velocity voltage $V_S$. The sensor 108 thus may operate on the basis of information from the position sensing unit 63 of FIG. 4 which has been discussed in detail with reference to FIGS. 10, 11, 12 and 13. In a similar way, the rotation of the turntable 3 in FIG. 2 is monitored by the turntable strobe and sensor (optical encoder) 45, which generates a pulse train signal 102 (ideally a square wave) representative of ω (where ω is the rotational speed radians/sec and a delayed pulse train signal 104. These signals 102,104 are both passed to two multiplying discriminators 110,112. The first discriminator 110 also receives the radius voltage signal $V_R$ from the radius sensor 108. From $V_R$ and the signals 102, 104, the discriminator 110 generates a voltage $V_1$ which is proportional to $V_R\omega$. That voltage $V_1$ is compared with a reference voltage $V_0$ representative of the desired linear velocity. The comparison is carried out by a servo amplifier 111, and this generates an output acting as the DC drive to the motor which rotates the turntable 3.

In a similar way, the second discriminator 112 receives the signals from the sensor 45, and also a reference voltage 213. The discriminator 112 is used to derive from the said pulse train a voltage $V_c$ proportional to $\omega$ alone, which is compared with the voltage $V_s$ which is representative of and substantially proportional to $$\frac{dR}{dt}.$$

The difference between the voltages $V_c$ and $V_s$ drives a servo amplifier 114 whose output causes radial motion. Thus the action of this second servo loop is such as to tend to hold $V_s$ equal to $V_c$. If the sensitivity of the discriminator circuit is suitably chosen in proportion to the desired track pitch P, then $V_c$ can be made representative of the quantity $$\frac{P\omega}{2\pi},$$

whereupon the action of this second servo loop is such as to hold the radial velocity $$\frac{dR}{dt}$$

equal to the desired value $$\frac{P\omega}{2\pi}.$$

In the arrangement of FIG. 15, suitable adjustment of the gains and frequency responses of the servo amplifiers 111 and 114 will normally be necessary, in a manner known to persons skilled in the art, to ensure a suitably accurate overall response consistent with stability. In particular the amplifier 114 may have the characteristics discussed above in connection with FIG. 14.

Figure 16:
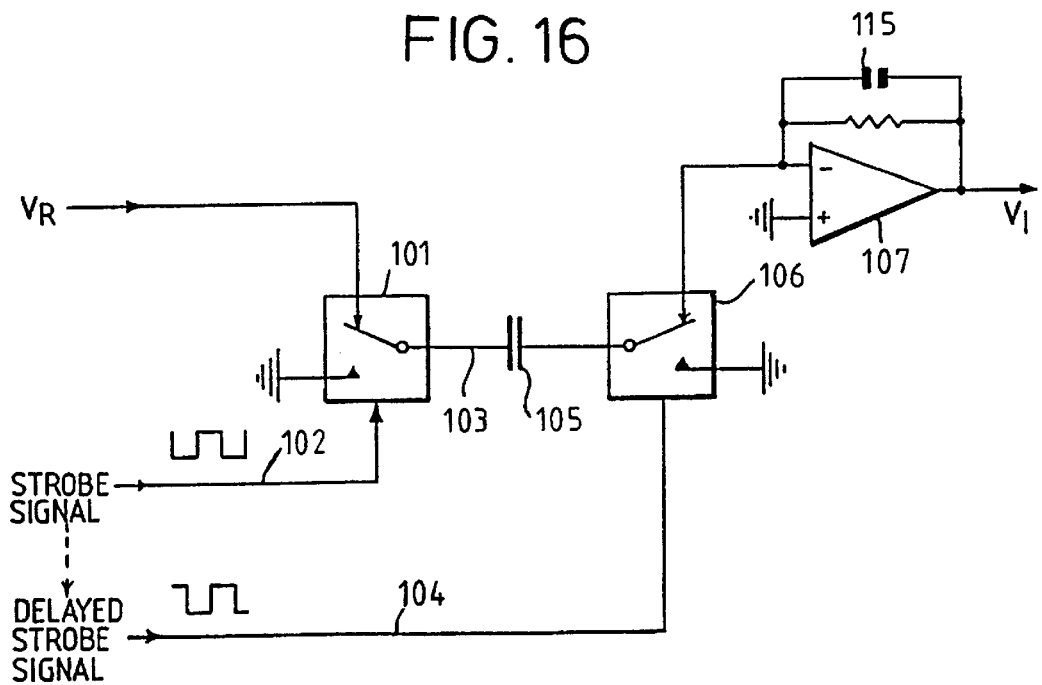
FIG. 16 shows a multiplying discriminator which may be used in the servo system of FIG. 15.

FIG. 16 illustrates a structure which may be used for the discriminator 110. The structure of discriminator 112 may be similar, with the reference voltage 213 replacing the signal $V_R$.

In FIG. 16, an electronic switch 101 is controlled by the pulse train 102 from the sensor 45. The switch 101 generates a voltage signal 103 which alternates between the radius voltage $V_R$ and ground, at the frequency of the pulse train 102. The voltage transitions of the waveform of the signal 103 cause current pulses to flow through a capacitor 105 to a second electronic switch 106, which is controlled by the delayed strobe signal 104 from the turntable strobe. That delay should be less than half a cycle. The delayed strobe signal 104 may be generated by a second optical sensor acting on the strobe disk, but may alternatively be generated by electronically delaying the strobe signal 102. As a result, the delayed strobe signal 104 gates the current pulses arriving from the capacitor 105, that gating being alternately between ground and the input of an amplifier 107. Thus, a mean voltage $V_1$ appears at the output of the amplifier 107 which is proportional both to $V_R$ and to the repetition rate of the strobe signal 102. Hence, $V_1$ is proportional to $V_R\omega$.

The capacitor 115 serves to attenuate the transitions in the waveform of the voltage $V_1$, which are due to the current pulses arriving from the capacitor 105.

The discriminator 112 of FIG. 15 may be the same as the discriminator of FIG. 16 except that in place of $V_R$ it uses a reference voltage 213 which does not vary with radius, but which may be set in proportion to the desired track pitch P so as to obtain an output voltage representative of $$\frac{P\omega}{2\pi}.$$

Figure 17:
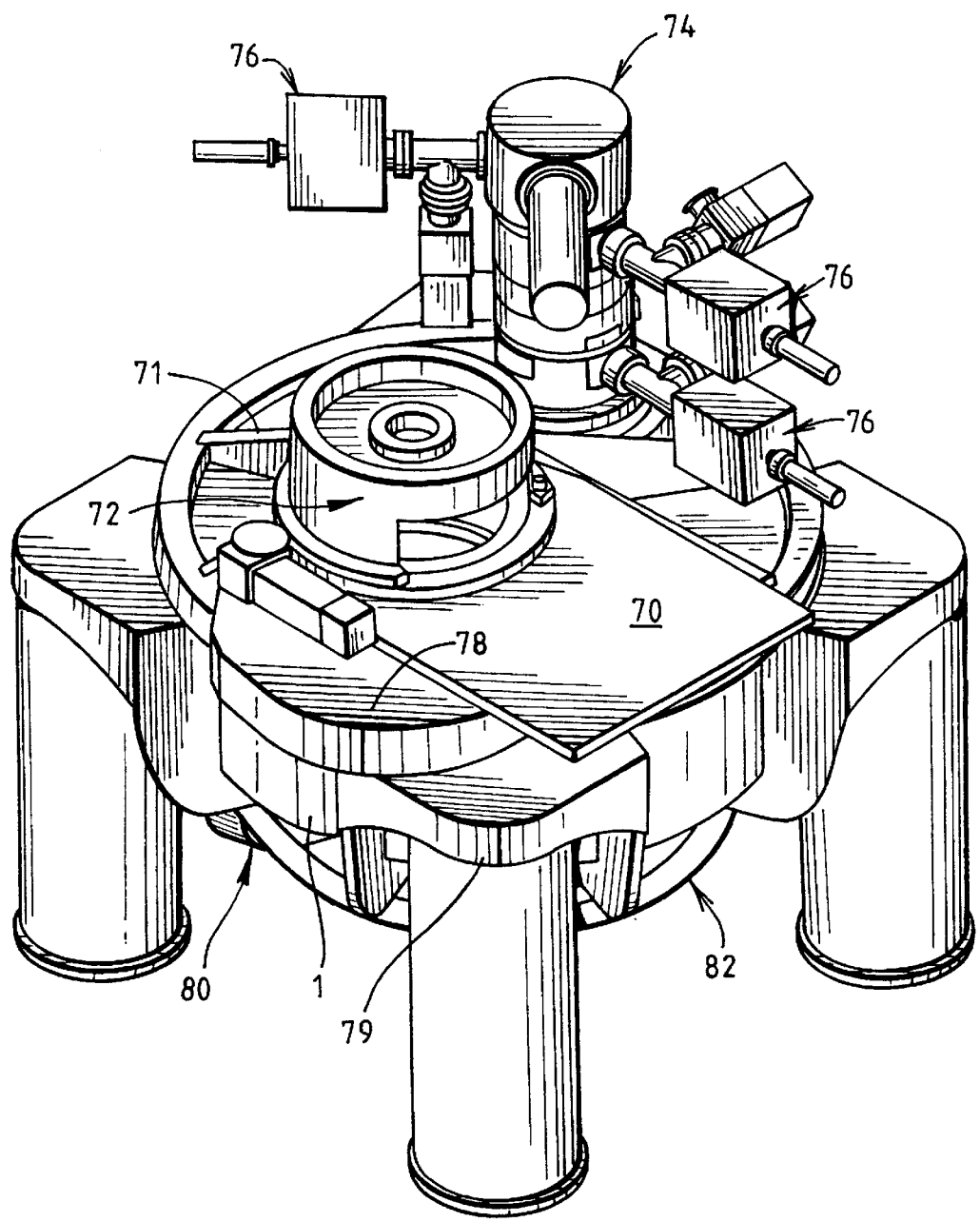
FIG. 17 is a perspective view of the embodiment of FIG. 1 in use.

FIG. 17 is a perspective view of a disk mastering system including a vacuum apparatus according to the invention in combination with a device for generating an electron beam for recording onto a disk. As shown a lid element 71 cooperates with the partition 1 to define the vacuum chamber 2. An area 70 is provided on which a disk is loaded. The disk can be locked in position by a locking mechanism 72 (shown incomplete) and treated by an electron beam generated by an electron beam column 74, including ion defusion pumps 76. A high vacuum valve 78 is provided for transferring matter into the vacuum chamber 2. The vacuum chamber 2 itself is isolated from vibration by active vibration isolators 79. The vacuum chamber 2 is evacuated using a turbo pump 80, and a vacuum roughing line 82 emerges from the recording system for connection to a roughing pump.

What is claimed is:

1. A vacuum apparatus including a vacuum chamber, a rotatable shaft mounted on a support body via a first air bearing, the first air bearing being provided within the vacuum chamber, a second rotatable shaft extending through a wall of a casing of the vacuum chamber and mounted therein by a second air bearing wherein the second shaft is hollow along its axis of rotation and the hollow portion is in communication with at least one air output from the first air bearing for the removal of air exhausting from the first air bearing.

2. A vacuum apparatus according to claim 1, wherein the first air bearing supports a turntable of a disk recording system.

3. A vacuum apparatus according to claim 2 wherein the first air bearing is movable relative to a recording head of the disk recording system.

4. A vacuum apparatus according to claim 1 wherein the first air bearing is rotatable about the second air bearing.

5. A vacuum apparatus according to claim 1 wherein at least one input conduit within the second shaft communicates with an air input of the first air bearing for the supply of air to the first air bearing.

6. A vacuum apparatus according to claim 1 wherein the first air bearing is provided within a second chamber.

7. A vacuum apparatus according to claim 6 wherein cables and/or pipes within the hollow portion of the second shaft are in communication with the second chamber for the transmission of electrical signals to the second chamber.

8. A vacuum apparatus according to claim 1 further comprising a roughing conduit wherein the roughing conduit is an output duct connecting an air output from the first air bearing to a vacuum source.

9. A vacuum apparatus according to claim 8 dependent on claim 6 wherein the roughing conduit is connected to a second air output from the first air bearing between an input end of a first air output and a sealing means which seals between a second chamber and the vacuum chamber.

10. A vacuum apparatus according to claim 1 further comprising a roughing conduit connecting an air output from the second air bearing to a vacuum source.

* * * * *